No. 814,691. PATENTED MAR. 13, 1906.
H. B. HALLOCK.
STORAGE BATTERY.
APPLICATION FILED MAY 15, 1905.
2 SHEETS—SHEET 1.
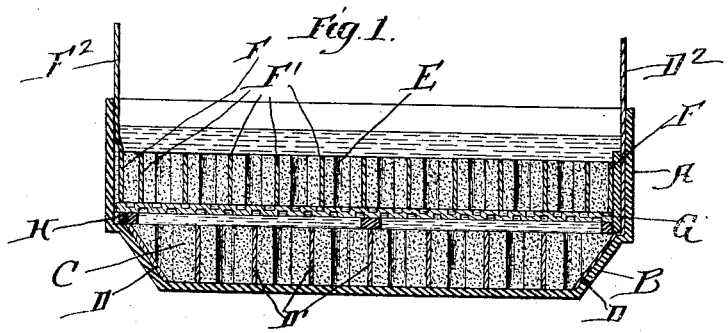
Fig. 1.
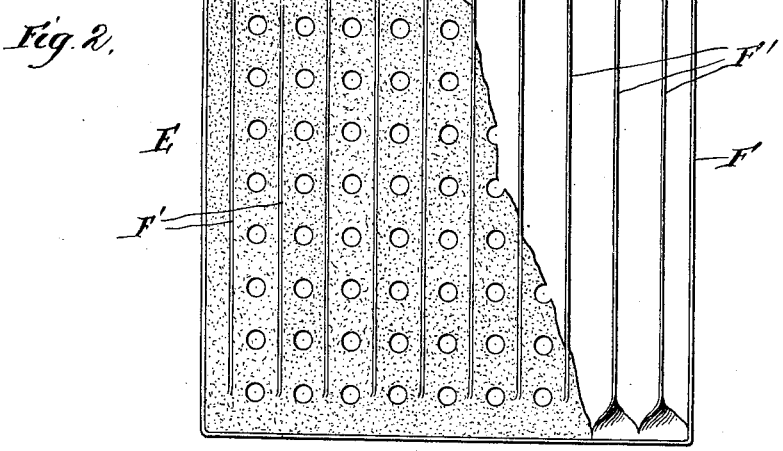
Fig. 2.
Fig. 3.
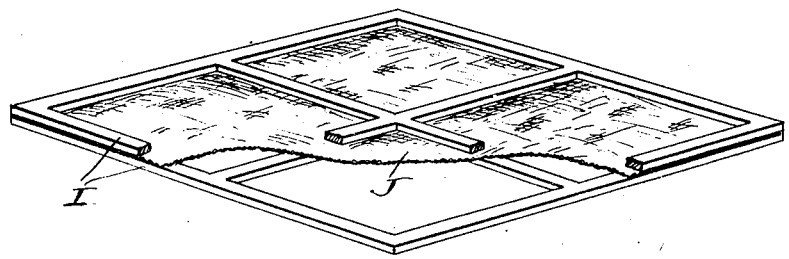
Witnesses:
L. A. Morrison
E. N. Schofield
Inventor:
Howard B. Hallock No. 814,691. PATENTED MAR. 13, 1906.
H. B. HALLOCK.
STORAGE BATTERY.
APPLICATION FILED MAY 15, 1905.

2 SHEETS—SHEET 2.

Witnesses.
L. H. Morrison
E. H. Schofield

Inventor.
Howard B. Hallock.

UNITED STATES PATENT OFFICE.

HOWARD B. HALLOCK, OF GERMANTOWN, PENNSYLVANIA, ASSIGNOR TO SAMUEL S. WILLIAMSON, OF PHILADELPHIA, PENNSYLVANIA.

STORAGE BATTERY.

No. 814,691.

Specification of Letters Patent.

Patented March 13, 1906.

Application filed May 15, 1905. Serial No. 260,418.

*To all whom it may concern:*

Be it known that I, HOWARD B. HALLOCK, a citizen of the United States, residing at Germantown, county of Philadelphia, and State of Pennsylvania, have invented a certain new and useful Improvement in Storage Batteries, of which the following is a specification.

My invention relates to a new and useful improvement in storage batteries, and has for its object to provide a storage battery consisting of only two plates, a negative and positive pole element placed horizontally within the containing-cell, and the containing-cell being so shaped as to form a supporting-frame for the lower plate and hold the active material in contact with the conductor during both the expansion and contraction of said active material.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 4:
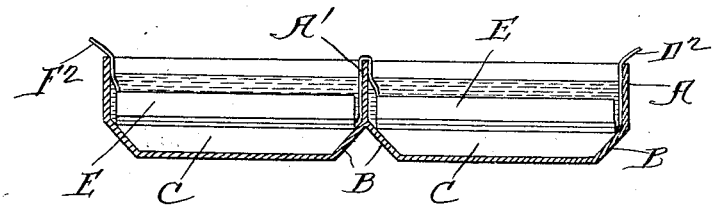
Figure 5:
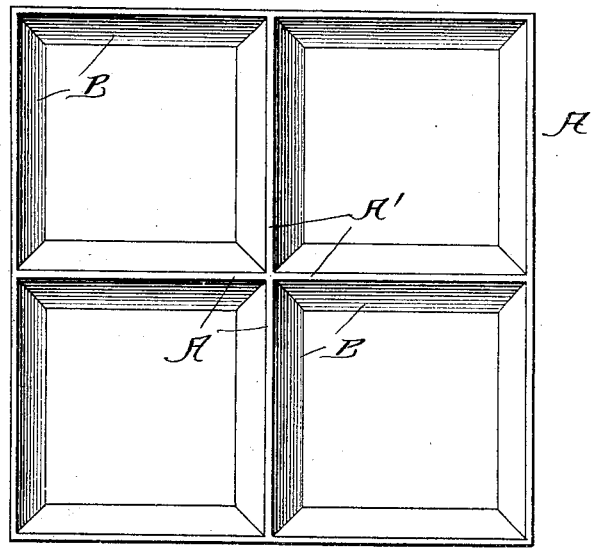

Figure 1 is a cross-section through my improved storage battery; Fig. 2, a plan view of the upper plate or negative-pole element with a portion of the active material broken away to show the grid; Fig. 3, a perspective view of a modified form of separator; Fig. 4, a cross-sectional view through a battery in which a number of cells are all contained within the same jar; Fig. 5, a plan view of a jar consisting of four cells.

The principal purpose of this invention is to provide a storage battery which can be manufactured at a comparatively small cost and will take up a small space relative to the output of the battery, and I purpose to use only two plates in each cell, said plates being comparatively thick, so that the output of the cell will be extremely large compared to its size and weight if the discharge rate is low.

A represents the containing-cell, which is made of any non-conducting non-porous material the sides of which are vertical from the top down to a point near the bottom, but the sides below the vertical portion incline inward and downward at an angle of preferably forty-five degrees, and in this portion of the jar bounded by the inclined sides, as represented at B, is located the positive-pole element C. This positive-pole element consists of a grid of conducting material, the four sides of which are inclined inward and downward, as represented at D, so as to lie flat against the inside of the inclined portions B of the sides of the jar. Strips D' extend across from one side to the other connected to the inclined sides D of the grid, and the active material is pasted within this grid, so formed that it will assume the shape as shown in Fig. 1 in cross-section. A lug D² extends upward from the grid. It will thus be seen that the positive-pole element lies upon the inclined portions B at the bottom of the jar, and when this positive-pole element expands, as it always does in formation, it will ride upward upon the inclined portions B, and the weight of the plate itself tends to force it downward, and these two forces—namely, gravity and expansion—working in opposition to one another will always hold the active material in close contact with the conductor, so as to prevent sulfate forming between the conductor and active material. When the positive-pole element expands, it will travel upward upon the inclined portions B, and when it contracts the weight of the plate will force it downward, and thus the inclined sides D of the grid will always be held in tight contact with the active material whether the plate is expanding or contracting, and the ribs D', extending through the active material, will also be held in contact with the active material because of the pressure upon the plate from all sides.

E represents the negative-pole element or upper plate, and this plate is formed simply of a grid of conducting material F, which surrounds the plate, and also has ribs F' extending across the same, the active material being pasted within this grid. This negative-pole element is simply made with straight sides, as it is not necessary in the negative-pole element to provide means for holding the conductor in such tight contact with the active material, as the injurious sulfate is not formed on the negative-pole element. A lug F² extends upward from the grid F. The plates of this cell being placed horizontal, it is of course necessary to guard against flakes of the active material falling downward from the upper plate to the lower and bridging across, so as to short-circuit the battery.

In Fig. 1 I have shown a solid but porous separator, such as wood, (represented at G,) which rests upon spacers H, of non-conducting material, which holds the separator G a distance above the plate C, so as to allow the electrolyte free access to the lower plate. Both plates are preferably provided with vertical holes formed therethrough to allow for the free gasing of the battery while on charge and also to allow the electrolyte access to all parts of the plates. The conducting-grids of both the upper and lower plates are preferably made of sheet-lead and bent into shape, being made all of one piece; but of course it is obvious that these grids could be cast or made in separate pieces burned together.

In Fig. 3 I have shown a modified form of separator which will allow a perforated sheet or a sheet of loosely-woven material to be interposed between the two plates.

I represents two identical frames of non-conducting material which are placed one above the other with a separating-sheet J between them. This sheet J may consist of a sheet of very-finely-perforated hard rubber or like material, or it may consist of loosely-woven asbestos, felt, or any other substance not affected by the acid. With this separator it will be seen that a space is allowed for the electrolyte above and below the separating-sheet J, and any of the active material which may pass through the meshes or perforations of the sheet J will be such small particles as not to build up or bridge through the sheet to the other plate, and the layer of electrolyte above and below the sheet will tend to prevent the formation of any bridge between the plates, and at the same time a separator is provided which will offer the least possible resistance to the flow of the current.

In Figs. 4 and 5 I have shown how a plurality of cells could be contained in one jar, the jar being divided by partitions A' into several compartments, and the botom of each of these compartments is inclined at B the same as described in connection with Fig. 1. Each of the individual cells is made in the same manner as before described; but the jar is all in one piece, so as to form a cluster of cells, thus adding to the convenience in handling and also reducing the cost of manufacture. It is obvious that any number of cells could be thus formed in one jar, and one cover could be made to answer for all of the cells, or each cell could have its individual cover

Having thus fully described my invention, what I claim as new and useful is—

1. In a storage battery, a jar of non-conducting material, two horizontally-arranged plates contained within the jar, the lower plate resting upon the bottom of the jar, the lower end of the sides of the jars to a height approximately level with the top of the lower plate being inclined inward and downward, the lower plate consisting of a grid of conducting material, said grid consisting of a frame inclined to fit upon the inside surface of the inclined sides of the jar and surrounding the plate with ribs extending across from one side to the other, active material pasted into the grid, a separator resting upon the top of the lower plate, the other plate resting upon the top of the separator.

2. In a storage battery, a jar, the lower end of the sides of which are inclined inward and downward, conductive material lining the inside surfaces of the inclined portions, ribs of conducting material extending across and connected to the conductive lining, a lug extending upward from this conductive material, active material pasted into the grid thus forming a plate, a separator resting upon the top of the plate thus formed, a second plate resting upon the top of the separator, both of said plates provided with vertical holes formed through the active material.

3. In a storage battery, a jar, the lower end of the sides of which are inclined inward and downward, a horizontally-arranged plate resting upon the bottom of the jar, said plate consisting of active material, and a conductor surrounding the plate and extending through the active material from one side to the other, the surrounding conductor being inclined to fit the inclined surfaces of the jar, a lug extending upward from the conductor of this plate, a separator resting upon the top of the plate, said separator consisting of a porous perforated sheet, spacers arranged above and below said sheet, a second plate arranged upon the top of the upper spacer, the openings through the perforated or porous sheet being smaller in diameter than the width of the space between the sheet and either of the plates, each of the plates being provided with vertical openings formed through the active material thereof.

In testimony whereof I have hereunto affixed my signature in the presence of two subscribing witnesses.

HOWARD B. HALLOCK.

Witnesses:
   MARY E. HAMER,
   L. W. MORRISON.